United States Patent
Lotspiech

(10) Patent No.: US 6,748,539 B1
(45) Date of Patent: *Jun. 8, 2004

(54) SYSTEM AND METHOD FOR SECURELY CHECKING IN AND CHECKING OUT DIGITIZED CONTENT

(75) Inventor: Jeffrey Bruce Lotspiech, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,644

(22) Filed: Jan. 19, 2000

(51) Int. Cl.[7] .......................... G06F 11/30; G06F 12/14; H04L 9/00; H04L 9/32
(52) U.S. Cl. .......................... 713/200; 705/51; 705/52; 380/262; 380/24; 380/44; 380/277
(58) Field of Search .......................... 705/51, 52, 262; 380/24, 44, 277

(56) References Cited

U.S. PATENT DOCUMENTS

| | | | |
|---|---|---|---|
| 4,694,491 A | 9/1987 | Horne et al. | 380/20 |
| 5,345,505 A | 9/1994 | Pires | 380/20 |
| 5,592,552 A | 1/1997 | Fiat | 380/21 |
| 5,636,276 A * | 6/1997 | Brugger | 705/54 |
| 5,734,719 A * | 3/1998 | Tsevdos et al. | 700/234 |
| 5,754,648 A * | 5/1998 | Ryan et al. | 380/201 |
| 5,910,987 A * | 6/1999 | Ginter et al. | 705/52 |
| 6,020,883 A * | 2/2000 | Herz et al. | 345/721 |
| 6,061,451 A * | 5/2000 | Muratani et al. | 380/201 |
| 6,434,535 B1 * | 8/2002 | Kupka et al. | 705/24 |
| 2001/0032088 A1 * | 10/2001 | Utsumi et al. | 705/1 |

FOREIGN PATENT DOCUMENTS

JP 2002-150056 * 4/2001

OTHER PUBLICATIONS

Intertrust Announces Internet and In–Store Kiosk Music Vending Solution; New Commerce 1.0 Addresses Music Piracy, Sales Channel, and Commerce Model Issues. Bussiness/Technology/Entertainment Editors. Business Wire. New York: Jul. 13, 1998.*
Cha G. Network and Security Gr. LG Electronics Institute of Technology. Dec. 20, 2000.*
ExtremeTech. Protecting Digital Assests: Digital Content Protection, Part III.*
Fujitsu:Technology Standards developed for music delivery System Over mobile phones. M2 Presswire. Coventry: Dec. 9, 1999.*
Mary Hayes. Online Shopping For Software—Say Goodbye to the Software aisle at the local computer mart. As online services expand, more software vendors will deliver goods electronically. InformationWeek. Manhasset: Jan. 2, 1995.*

(List continued on next page.)

Primary Examiner—Emmanuel L. Moise
Assistant Examiner—Ali Mashaal
(74) Attorney, Agent, or Firm—John L. Rogitz

(57) ABSTRACT

A system and method for permitting the rental of digitized content such as music from a kiosk includes a flash memory device that is insertable into the kiosk. The kiosk derives a content key from a media key block and a media ID on the flash memory device, and then encrypts the content using the content key and records the content on the flash memory device. The flash memory device can then be removed and engaged with a player-recorder which decrypts the content and plays the content. When it is desired to check the content back in, the flash memory device is engaged with the kiosk and the content is erased. Importantly, the media ID of the flash memory device is altered during check in, such that if the user saved the content prior to check in, the content, if recorded back onto the flash memory device after check in, could not be decrypted.

17 Claims, 2 Drawing Sheets

OTHER PUBLICATIONS

Memory Stick Copyright Protection Technology–Magic Gate– Key Technology for Digital Content.*

Kanehira, Akira. Pin Secure MultiMediaCard to Support the Secure Ubiquitous Information Society.*

Sukegawa, Hiroshi. How About Security System of Smart-Media? SSFDC Forum San Jose. Feb. 7, 2000.*

Business/Technology/Entertainment Editors, "InterTrust Accounces Internet and In–Store Kiosk Music Vending Solution; New Cmmerce 1.0 Address Musinc Priacy, Sales Channel, and Commerce Model Issues". Business Wire Jul. 13, 1998 p. 1.

* cited by examiner

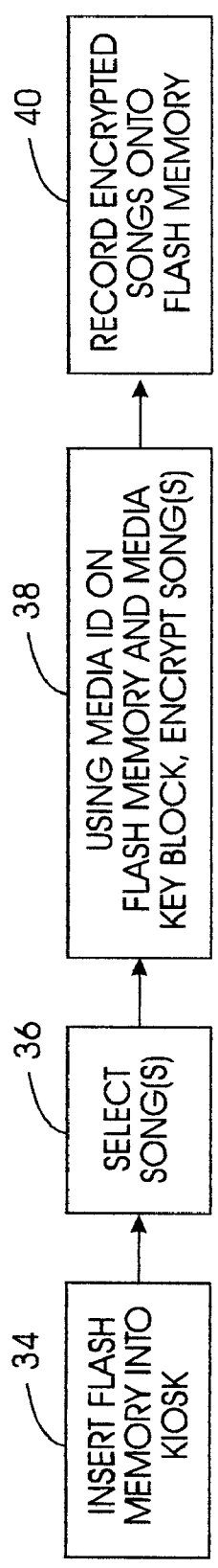
FIG. 3 - CHECK OUT
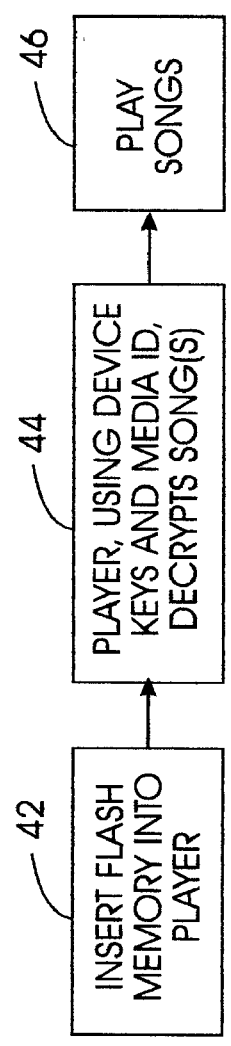
FIG. 4 - PLAY
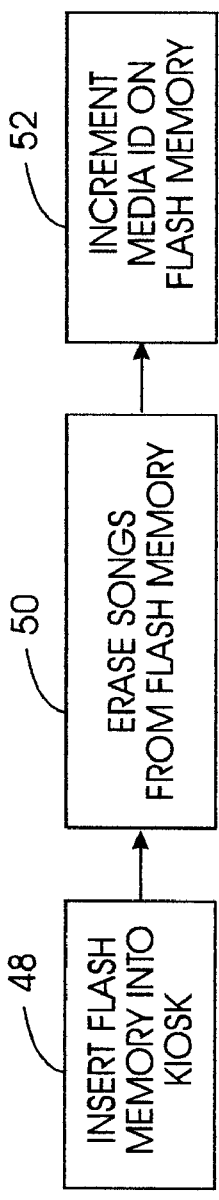
FIG. 5 - CHECK IN

SYSTEM AND METHOD FOR SECURELY CHECKING IN AND CHECKING OUT DIGITIZED CONTENT

RELATED APPLICATIONS

This application is related to U.S. patent applications Ser. Nos. 09/065,938, filed Apr. 24, 1998, 09/358,162, filed Jul. 20, 1999, and 09/379,049, filed Aug. 23, 1999, all of which are incorporated herein by reference.

BACKGROUND OF THE INVENTION

1. Field of the Invention

The present invention relates generally to protecting artistic content in digitized form, and more particularly to preventing reuse of rented digitized music on a flash memory device after the device has checked the music back in to a vending machine.

2. Description of the Related Art

The advantages of digitized video and music are numerous, but one significant drawback is that being digitized, the content is relatively easy to copy perfectly, without authorization of the copyright owner. Indeed, widespread copying by pirates costs content owners billions of dollars per year. Thus, the present invention as well as the above-referenced parent applications understand that it is desirable to limit the unauthorized copying of digital audio and video.

One particular application that requires content protection is that of rented music. It happens that music CDs can be rented in certain jurisdictions, and then returned for a refund of a deposit at the end of the rental term. Along these lines, flash memory devices have been proposed that a user can insert into a music rental kiosk or other content vending apparatus, pay a fee to "check out" a particular song or album, which is recorded onto the flash memory. The flash memory device is then removed from the kiosk and inserted into an authorized player that plays the music. When the user is finished with the music, the user again inserts the flash memory into a kiosk, which "checks in" the music by erasing it from the flash memory and refunding part of the rental fee to the user, like returning a deposit.

In another application, music is distributed electronically with the intention that it will be played by a flash memory music player for an end user. It is desirable, however, that a single downloaded song not become the source of many copies. To restrict the number of copies that can be made, the present invention recognizes that the client application of the music system might "check out" the song to each player, but restrict the number of copies that can be checked out at any one time to, e.g., three. To check out the song to additional players, one of the checked out copies would first have to be checked back in.

In any case, the problem addressed by the present invention is that of unscrupulous users, having checked out a music track, recording the data on another computer, then checking the music back in to receive their refund (or enable the music to be checked out to another player). In the rental context, the unauthorized copy of the music could then be downloaded from the computer onto the flash memory and replayed without paying royalties to the content owner.

One way to prevent the reuse of an unauthorized copy of a piece of digitized music is to arrange a complex cryptographic protocol between the flash memory device and the check in/check out application at the kiosk. Unfortunately, such protocols require a considerable number of logic gates on the flash memory device, which, owing to the nature of flash memory, is expensive and undesirable. The present invention recognizes that the principles set forth in the first of the above-referenced patent applications can be used to prevent the reuse of pirated music from a rental kiosk.

SUMMARY OF THE INVENTION

A system is disclosed for renting digitized content. The system includes at least one content vending apparatus, preferably a computer kiosk, storing digitized content, and at least one memory device, preferably a flash memory device, that can be engaged with the content vending apparatus. A media ID is stored on the memory device, with the vending apparatus using at least the media ID to derive a content key. The vending apparatus encrypts content using at least the content key, and then records the encrypted content on the memory device. At least one player-recorder is subsequently engageable with the memory device for decrypting and playing the content.

In a preferred embodiment, a media key block is accessible to the vending apparatus at least when the memory device is engaged therewith. The vending apparatus uses the media key block to derive the content key, prior to recording the content onto the memory device. Preferably, each player-recorder includes plural computer-usable device keys selected from a set of device keys for decrypting the content.

As intended by the present invention, the memory device can be engaged with the vending apparatus after the content has been recorded to check in the content to the vending apparatus by causing the content to be erased from the memory device. As part of the check in, the media ID is altered, preferably by incrementing the media ID.

In another aspect, a computer includes a data storage device including a computer usable medium having computer usable code means for checking in digital content from a memory device having a media ID. The computer usable code means includes computer readable code means for erasing the content. Also, computer readable code means are provided for altering the media ID.

In yet another aspect, a method for renting digitized content includes using a media ID on a memory device to derive an encryption key. The method then uses the encryption key to encrypt the content, which is then recorded onto the memory device to check out the content. The content subsequently can be checked in by erasing the content from the memory device and altering the media ID. Rental payment can be accepted from a user as a condition of check out, and a refund can be made to the user as part of check in.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the acts for checking out digitized content;

FIG. 4 is a flow chart of the acts for playing digitized content; and

FIG. 5 is a flow chart of the acts for checking in digitized content.

DETAILED DESCRIPTION OF THE PREFERRED EMBODIMENTS

Figure 1:
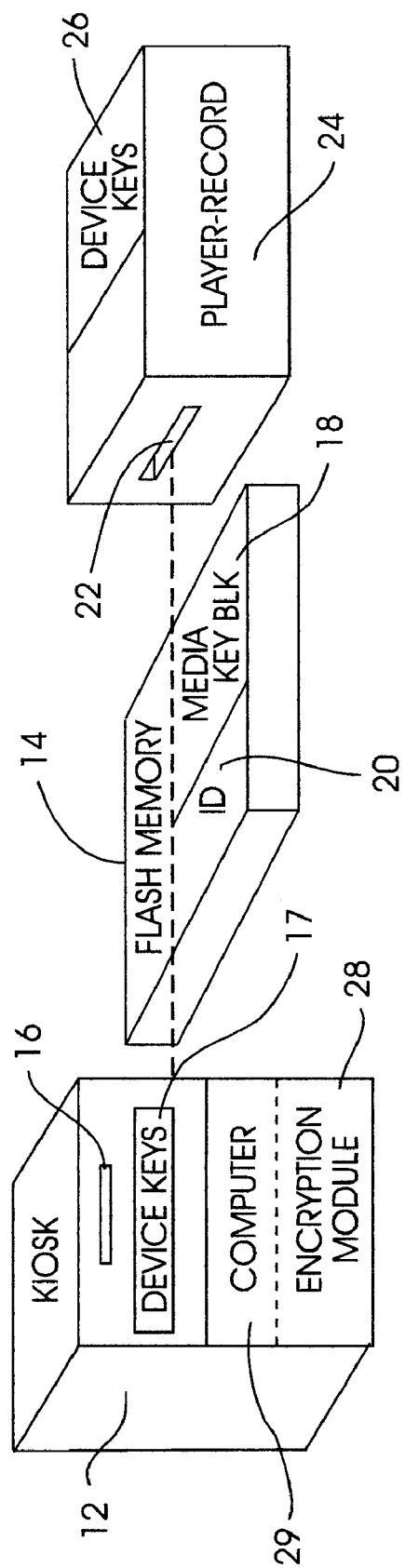
FIG. 1 is a schematic diagram of the present system.

Referring initially to FIG. 1, a system for encryption of rented digitized content such as music is shown, generally designated 10. In the particularly preferred architecture shown, the system 10 includes plural computer kiosks 12 (only one kiosk 12 shown for clarity of disclosure) that can be used to rent music by recording an encrypted version of the music onto portable flash memory devices 14 (only a single flash memory device 14 shown for clarity of disclosure). Specifically, a person can advance the flash memory device 14 into a receptacle 16 of the computer kiosk 12, then insert money or a credit or debit card into the kiosk and select one or more songs (or indeed, video content) for rental to rent the content. As disclosed in detail below, using a set of locally-stored device keys 17 and a media key block 18 stored on the flash memory device 14, in combination with a preferably eight byte media identification ("media ID") 20 on the flash memory device 14, the kiosk 12 encrypts the selected content and records it onto the flash memory device 14.

Subsequently, the flash memory device 14 can be inserted into a receptacle 22 of a player-recorder 24 that includes its own digital processor, and the player-recorder 24 decrypts the content using a set of device keys 26 that are stored or are otherwise available to the player-recorder 24 to decrypt and play the content. When the user is finished with the content, the user inserts the flash memory device 14 back into a kiosk 12 and selects "check in", which causes the kiosk 12 to erase the content from the flash memory device 14 and refund money to the user.

Alternatively, as discussed above the music source that checks out and checks in digitized content can be an authorized device that checks out music only to a predetermined number of players at one time, and that refuses to check out an additional copy unless one of the outstanding copies is first checked back in, although no rental transaction/refund is necessarily implicated. Regardless, the logic below is implemented, which, for clarity of disclosure, is directed to a rental context.

It is the purpose of the present invention to enable legitimate users to check out and check in rented content as described above, but, should the user illicitly record the content onto, e.g., a computer prior to check-in, to also prevent the content from being subsequently playable when re-recorded back onto the flash memory device 14 after check in.

Accordingly, an encryption module 28 is accessible by the computer kiosk 12, which is controlled by a digital processing apparatus such as a computer 29. In one intended embodiment, the digital processing apparatus is included as a digital signal processor (DSP) or application specific integrated circuit (ASIC) chip or other digital processing circuitry in the kiosk 12. Other digital processors, however, may be used, such as a personal computer or laptop computer made by International Business Machines Corporation (IBM) of Armonk, N.Y., or any other suitable processing apparatus. In any case, the processor of the kiosk 12 accesses the encryption module 28 to undertake the logic shown and discussed below, which may be executed by a processor as a series of computer-executable instructions.

Figure 2:
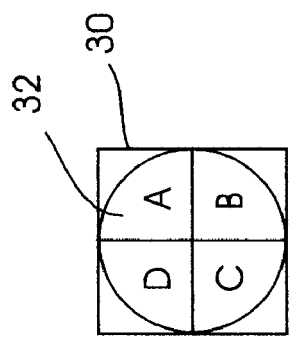
FIG. 2 is a schematic diagram of a computer program product.

The instructions may be contained on a data storage device with a computer readable medium, such as a computer diskette 30 shown in FIG. 2 having a computer usable medium 32 with code elements A–D stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Indeed, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

In the above-referenced parent applications, the present media key block is referred to as the "session key block". For a fuller understanding of the details of the preferred encryption scheme and how it can be used to defeat unauthorized copyists, a brief summary of the preferred encryption scheme in accordance with the above-referenced patent applications is presented.

Specifically, a media key "x" is encrypted by a matrix of device keys $S_{j,i}$ to render the media key block 18, which is stored on the flash memory device 14 at the time of manufacturing the flash memory device 14. In the above-disclosed applications, plural media keys $x_i$, i=1, . . . ,N can be encrypted in the presence of a particular attack, but for simplicity it will be assumed herein that only a single media key "$x_i$", i=constant, is encrypted with the set of the device keys $S_{j,i}$, i=constant, j=1, . . . ,M. Each device key as well as the media key "x" is a random number of predetermined bit size with the predetermined bit size of the presently preferred embodiment being sixty four (64). In accordance with present principles, "i" is a key index variable and "j" is a sets index variable.

It is to be understood that each kiosk 12 and each player-recorder 24 is assigned selected device keys "S" from the matrix by a licensing agency. For example, a first user player-recorder 24 might be assigned the keys $S_{3,1}$, $S_{5,2}$, $S_{1,3}$, $S_{1,4}$, $S_{6,5}$, $S_{4,6}$, and $S_{8,7}$. In any case, each kiosk 12 and each player-recorder 24 is assigned at least one and up to "N" device keys, and each kiosk 12/player-recorder 24 is assigned no more than one device key "S" for each key index variable "i". Embodiments, however, wherein a device might not include a device key for each and every $i^{th}$ position are within the scope of the above-referenced invention. In any case, no single kiosk 12/player-recorder 24 learns two keys at the same position in the key index dimension. Preferably, no kiosk 12/player-recorder 24 has exactly the same device keys "S" as any other device, although the device keys of many devices might overlap. It may now be appreciated that the media key block is representable by a matrix having at least dimensions "i" and "j", and that, when only a single media key "x" is used that media key block will have a single row (corresponding to "i") and "M" columns (corresponding to the $S_j$, j=1 to M inclusive, device keys, after being each device key is combined with the media key "x").

With the above summary of one preferred encryption protocol in mind, reference is made to FIG. 3. At block 34 of FIG. 3 the flash memory device 14 is inserted into the kiosk 12. At block 36 a user selects, using controls provided by the kiosk 12, one or more songs or other digital content (such as videos) that the user wishes to rent. At this point, the user can be prompted to pay a rental fee with deposit using cash, or a debit or credit card, as a condition precedent to the below steps.

Moving to block 38, using the encryption module 28 and its set of device keys 17, and more particularly its $i^{th}$ device key, the kiosk 12 reads the flash memory device 14 and decrypts the media key "x" from the media key block 18. Then, the kiosk 12 combines the media key "x" with the media ID 20 to render a content key. All methods of combination are contemplated herein; in an exemplary embodiment, the media identification is concatenated with each entry of the media key block and the result is then cryptographically hashed using the Secure Hashing Algorithm (SHA). Using the content key, the kiosk 12 encrypts the selected content and then records the encrypted content onto the flash memory device 14 at block 40.

FIG. 4 shows that to play the rented content, the user inserts the flash memory device 14 into the player-recorder 24 at block 42. Moving to block 44, the player-recorder 24 reads the media key block 18 and media ID 20 from the flash memory device 14 and uses its $i^{th}$ device key to determine the content key in accordance with above principles. Then, using the content key, the player-recorder 24 decrypts the content. The content is played at block 46.

Now referring to FIG. 5, the preferred check-in process is shown. Commencing at block 48, the flash memory device 14 is inserted into the kiosk 12. Proceeding to block 50, the content to be checked in is erased from the flash memory device 14. If desired, the user is refunded a deposit after check in. Then, the media ID 20 on the flash memory device 14 is altered by the kiosk 12 at block 52. Preferably, the media ID is incremented by unity.

It may now be appreciated that in the event the user records the content onto a computer prior to check in, the recording includes the "old" content key, and that owing to the fact that the media ID is subsequently altered at block 52, should the user attempt to record the content back onto the flash memory device 14 after check in, the content cannot be successfully decrypted.

While the particular SYSTEM AND METHOD FOR SECURELY CHECKING IN AND CHECKING OUT DIGITIZED CONTENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A system for renting digitized content, comprising:
   at least one content vending apparatus storing digitized content;
   at least one memory device engageable with the content vending apparatus, the memory device including a media ID thereon, the vending apparatus using at least the media ID to derive a content key different from the media ID, the vending apparatus encrypting content using at least the content key and recording the encrypted content on the memory device; and
   at least one player-recorder engageable with the memory device for decrypting and playing the content.

2. The system of claim 1, wherein the vending apparatus is a kiosk.

3. The system of claim 1, wherein the memory device is flash memory device.

4. The system of claim 1, further comprising a media key block accessible to the vending apparatus at least when the memory device is engaged therewith, the vending apparatus using the media key block to derive the content key, prior to recording the content onto the memory device.

5. The system of claim 4, wherein the vending apparatus includes at least one computer-usable device key to derive a media key from the media key block.

6. The system of claim 5, wherein the vending apparatus combines the media key with the media ID to render the content key.

7. The system of claim 4, wherein each player-recorder includes at least one computer-usable device key for decrypting the content.

8. The system of claim 1, wherein the memory device can be engaged with the vending apparatus after the content has been recorded to check in the content to the vending apparatus by causing the content to be erased from the memory device, the media ID being altered as part of check in.

9. The system of claim 8, wherein the vending apparatus alters the media ID of the memory device.

10. The system of claim 9, wherein the vending apparatus alters the media ID of the memory device by incrementing the media ID by unity.

11. A computer including a data storage device including a computer usable medium having computer usable code means for checking in digital content from a memory device having a media ID, the computer usable code means having:
    computer readable code means for erasing the content; and
    computer readable code means for altering the media ID.

12. The computer of claim 11, further comprising computer readable code means for encrypting and recording content onto the memory device.

13. The computer of claim 12, wherein the memory device includes a media key block and a media ID, and the means for encrypting includes means for deriving a media key from the media key block, and combining the media key with the media ID to render a content key, the content key being used to encrypt the content.

14. A method for renting digitized content, comprising:
    using a media ID on a memory device, deriving an encryption key;
    using the encryption key, encrypting the content;
    recording the content onto the memory device to check out the content; and
    checking in the content by at least erasing the content from the memory device and altering the media ID.

15. The method of claim 14, wherein the media ID is altered by incrementing the media ID.

16. The method of claim 14, wherein the encryption key is a content key derived at least in part by decrypting a media key from a media key block on the memory device.

17. The method of claim 14, further comprising:
    accepting rental payment from a user as a condition of the recording act; and
    making a refund to the user as part of the checking in act.

\* \* \* \* \*